Feb. 19, 1952     R. S. ENABNIT     2,586,526
AIR BAG ELECTRODE CONSTRUCTION FOR RADIO-FREQUENCY
HEATING OF PNEUMATIC TIRES
Filed March 17, 1949
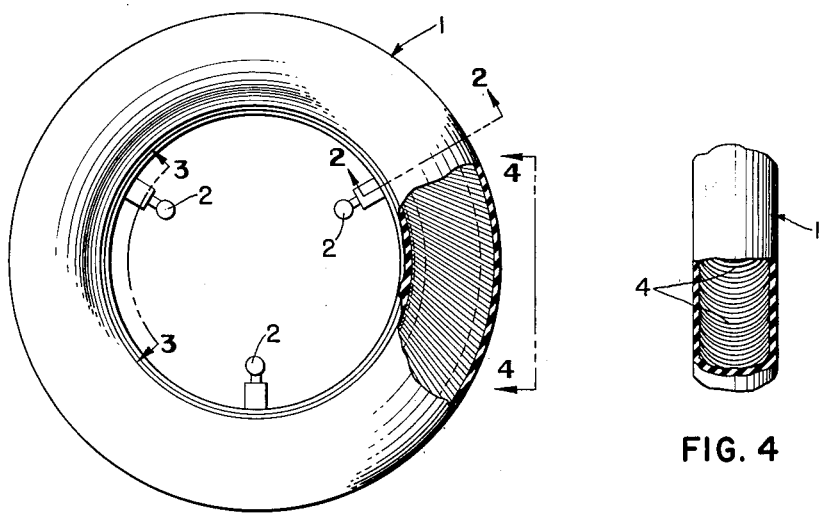
FIG. 1
FIG. 4
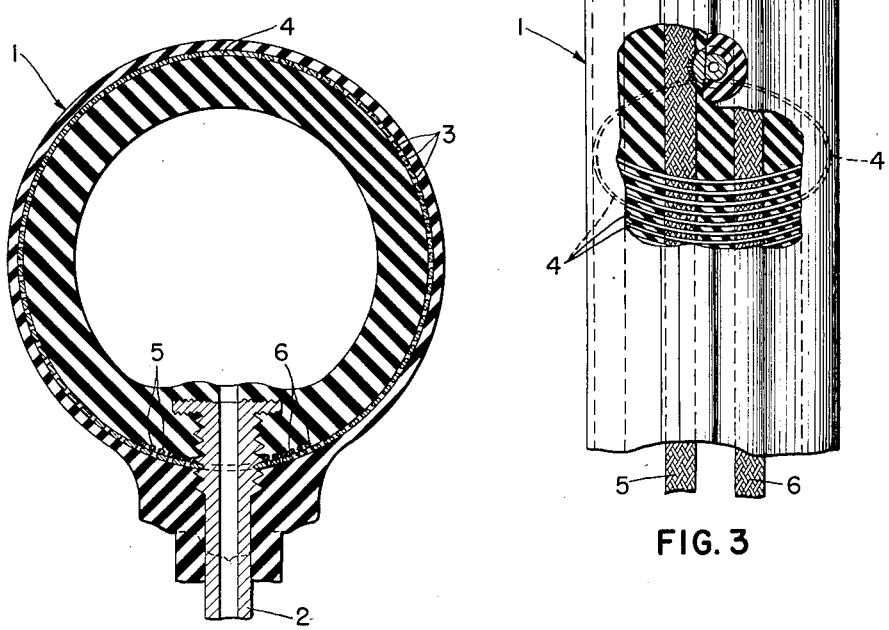
FIG. 2
FIG. 3
*INVENTOR.*
ROBERT S. ENABNIT
BY
ATTORNEY Patented Feb. 19, 1952

2,586,526

UNITED STATES PATENT OFFICE 2,586,526

AIR BAG ELECTRODE CONSTRUCTION FOR RADIO-FREQUENCY HEATING OF PNEUMATIC TIRES

Robert S. Enabnit, Cuyahoga Falls, Ohio, assignor to Wingfoot Corporation, Akron, Ohio, a corporation of Delaware Application March 17, 1949, Serial No. 81,912

13 Claims. (Cl. 18—45)

This invention relates to airbag construction, particularly to airbags having electrodes therein and adapted for use in the radio frequency electrical heating and vulcanization of pneumatic tires.

Heretofore there has been a great amount of development work done upon radio frequency heating and the application of same to commercial operations. Such heating processes have been proposed for use in the vulcanization of rubber tires but so far as is known none of these have gone into production use because of the many problems present. It is the usual practice in these proposals to employ the vulcanizing mold as one of the radio frequency electrodes, and it has been suggested to incorporate the other electrode with the usual airbag employed in the operation. However, incorporating the electrode in the airbag presents difficulties. The airbag with the electrode therein must still be flexible to allow for insertion and removal from the tire. The airbag must be free to expand into the tire to force the tire into the vulcanizing mold. The electrode in the airbag must necessarily be of such a construction as to permit the airbag to be used in a normal manner.

At the present time, it has been very difficult to provide any type of an airbag which will have desired normal operating characteristics and still have a high frequency electrical conductor positioned therein for use in radio frequency curing operations.

The general object of the present invention is to provide a new type of airbag wherein a special high frequency electrode is provided in the airbag and wherein the airbag is characterized by having the flexibility and resilience required for airbag use.

Another object of the invention is to provide an airbag wherein a high frequency conductor is positioned in the airbag in the form of a plurality of convolutions of the conductor wire to form a layer of conductors in the airbag extending around the bore of the airbag.

A further object of the invention is to provide a plurality of substantially oval-shaped convolutions of an electrical conductor which are embedded in an airbag wall at an appreciable angle with relation to a radius of the airbag.

A further object of the invention is to provide an airbag of the class described wherein electrical energy may easily be transmitted to conductors positioned within the airbag.

The foregoing and other objects and advantages of the invention will be pointed out in more detail as the specification proceeds.

Attention is now directed to the accompanying drawings, wherein:

Fig. 1 is an elevation, partially broken away and shown in section to show the conductor wires therein, of an airbag embodying the principles of the invention;

Fig. 2 is an enlarged vertical section taken on line 2—2 of Fig. 1;

Fig. 3 is an enlarged elevation taken substantially on line 3—3 of Fig. 1 with a portion of the airbag being broken away and shown in section to bring out the internal construction thereof; and Fig. 4 is an elevation taken on line 4—4 of Fig. 1 with a portion of the airbag being removed to show the positioning of the electrical conductors in the airbag of the invention.

The present invention relates to a special type of an airbag for use in the high frequency curing of pneumatic rubber tires and the airbag is characterized by the provision of a layer of convolutions of wire being embedded in the airbag with the convolutions extending at an appreciable angle to a radius of the airbag whereby the convolutions, which are in substantially parallel relation, are oval-shaped and connect to a terminal conductor which extends circumferentially of the tire and in turn connects to a conductive valve stem that protrudes from the body of the airbag.

For a better understanding of the present invention, reference should be had to the details of the embodiment of the invention illustrated and described hereinafter in detail.

The airbag of the invention is shown as comprising a substantially annular airbag body 1 that is made from conventional rubber material in use for the construction of such devices. The airbag 1 is of generally annular form and is substantially tubular in radial cross section, as indicated in Fig. 2 of the drawings. The airbag 1 is preferably provided with a plurality of metallic or otherwise electro-conductive valve stems 2 which protrude from the airbag 1 but which have base portions (Fig. 2) that are embedded in the wall of the airbag 1.

As an important feature of the present invention, the airbag 1 has a layer of convolutions of a high frequency electrical conductor wire 3 provided therein. This wire 3, which is shown as forming a plurality of helical convolutions 4 within the airbag 1, preferably is continuous and each convolution 4 is of substantially oval shape. The wire 3 in forming one of the convolutions 4 extends from a radially innermost point of the airbag 1 to a radially outermost point of the airbag in a direction which may be called forwardly of the airbag at an appreciable acute angle with the circumference of the airbag 1 at any portion of the airbag. Then the wire 3, in returning to its starting point to complete one of the convolutions 4 extends in what may be called backwardly of the airbag 1 to a point immediately adjacent the starting point of such specific convolution. In so doing, the wire 3 extends at an appreciable acute angle to a circumference of the airbag 1 on the other side wall portion of the airbag. It has been established that by having these convolutions 4 of oval shape and lying at an appreciable angle to both a circumference and a radius of the airbag 1, the airbag can be collapsed and folded upon itself without disrupting the individual wire convolutions. Furthermore, the airbag 1 can be expanded in a radial direction to expand the unvulcanized tire into the vulcanizing mold. Usually the angle that the individual convolutions form with the circumference or with a radius of the airbag 1, would be any desired angle between about 30 degrees and about 45 degrees, although such angle preferably is formed with a radius of the airbag.

Transmittal of electrical energy to the individual convolutions provided in the airbag is facilitated in the present construction by the use of a plurality of braided electrical conductor strips 5 and 6 that extend circumferentially of the airbag 1 and are in immediate adjacent relation to and contact with the individual convolutions 4. Since the airbag has an appreciably high pressure, such as about 200 pounds per square inch set up therein when in operation, such pressure aides in forcing the terminal strips 5 and 6 into good electrical contact with the individual convolutions 4. Furthermore, since the wire 3 is continuous throughout the airbag 1, the wire will be in good electrical contact with the conductors or terminal strips 5 and 6 at at least various points circumferentially of the tire and facilitate flow of high frequency current through the convolutions 4.

It will be appreciated that the terminal strips 5 and 6 must connect to suitable terminal means by which electrical connection can be made thereto. In this instance, the valve stems 2 are metallic or otherwise electro-conductive whereby the strips 5 and 6 are soldered, brazed or otherwise connected to the valve stems to provide terminal means therefor.

It should be noted that the airbag of the invention may in some instances be of less circumferential extent than 360 degrees and that such airbag can be used with any desired high frequency electrical current. Of course the positioning and spacing of the convolutions 4 may also be varied, depending upon the size of the wire used in forming the convolutions 4 and in the particular operational characteristics desired from the airbag 1. However, by use of the particular shape and immediately adjacent positioning of the convolutions as shown in the present invention, an effective, operative airbag can be provided.

Of course the wire 3 may be wound around the airbag 1 in the construction of same in any desired manner. Usually the airbag would be suitably positioned and the wire would then be looped around the annular tubular portion of the airbag body so as to pass from the radially inner to the radially outer portion thereof and then back around to the radially inner portion of the airbag immediately adjacent the starting point of the prior convolution.

It will be realized that any type and number of conductors may be used in the airbag of the invention, as are desired, as long as they extend around the bore of the airbag forming member and with each convolution of wire being oval shaped and substantially lying in a plane which is at an appreciable angle to a radius of the bag. A single wire in braid or other form may be used to form all of the convolutions 4, or a separate wire may be used to form one or more convolutions 4, the ends of the wire being anchored to the terminal strips 5 and 6. The convolutions need not extend across the space at the radially inner portion of the airbag. The wire 3 conveniently has a flattened oval shape in cross-section.

From the foregoing it will be seen that a novel airbag has been provided for use in the high frequency vulcanization of rubber tires and that the objects of the invention are achieved.

While certain representative embodiments and details have been shown for the purpose of illustrating the invention, it will be apparent to those skilled in this art that various changes and modifications may be made therein without departing from the spirit or scope of the invention.

What is claimed is:

1. An airbag for use in the vulcanization by high frequency of pneumatic tires and the like, which airbag comprises a rubber member having an external contour substantially corresponding to the internal contour of a pneumatic tire, which member is tubular in section, and a layer of oval-shaped convolutions of an electro-conductive member embedded in said body with the individual convolutions being in substantially parallel relation, said convolutions entirely encircling the body and extending over the entire circumference of the body.

2. An airbag for use in the vulcanization by high frequency of pneumatic tires and the like, which airbag comprises an annular body of rubber which is tubular in section, and a layer of convolutions of a continuous electro-conductive member embedded in said body and extending completely around the tubular body, said convolutions being at an inclination of from about 30 to 45 degrees with relation to a radius of said body.

3. An airbag for use in the vulcanization by high frequency of pneumatic tires and the like, which airbag comprises an annular body of rubber which is tubular in section, and a layer of oval-shaped convolutions of a continuous electro-conductive member embedded in said body and extending entirely around the tubular body, over the entire circumference thereof.

4. An airbag for use in the vulcanization by high frequency of pneumatic tires and the like, which airbag comprises an annular body of rubber having an external contour substantially corresponding to the internal contour of a pneumatic tire, which body is tubular in section to form a bore therein, and a layer of conductive wire embedded in said body as a plurality of endless convolutions that are in substantially parallel relation, all of said convolutions being at an appreciable inclination with relation to a radius of said body and extending completely around the bore of said body.

5. An airbag for use in the vulcanization by high frequency of pneumatic tires and the like, which airbag comprises an annular body of rubber having an external contour substantially corresponding to the internal contour of a pneumatic tire, which body is tubular in section, to form a bore therein, a metallic valve stem embedded in said body and extending from the periphery of same on the inner circumference thereof, a high frequency conductor wire embedded in said body and being formed into a plurality of substantially oval-shaped convolutions extending around the bore of same, said convolutions being closely adjacent each other and being at an angle of between approximately 30 and 45 degrees with a radius of said body, and a high frequency conductor embedded in said body and extending therearound to contact said convolutions of said conductor wire and said valve stem.

6. An airbag for use in the vulcanization by high frequency of pneumatic tires and the like, which airbag comprises an annular body of rubber that has sidewall portions and that is tubular in section and forms a bore therein, a conductive valve stem embedded in said body and protruding therefrom, a high frequency conductor wire embedded in said body and being formed into a plurality of substantially parallel convolutions extending around the bore of same, said convolutions being closely adjacent each other and with each convolution extending from the radially inner portion of the body to the radially outer portion of the body at an acute angle to a circumference of said body at the periphery thereof from one sidewall portion of the body and back at substantially the same angle to the circumference on the opposite sidewall of the body to a point adjacent the starting point of the convolution, and a high frequency conductor embedded in said body and extending around the circumference thereof, said conductor being in contact with substantially all of said convolutions of said conductor wire and with said valve stem.

7. An airbag for use in the vulcanization by high frequency of pneumatic tires and the like, which airbag comprises an annular body of rubber having an external contour substantially corresponding to the internal contour of a pneumatic tire, which body is tubular in section to form a bore therein, a metallic valve stem embedded in a said body and extending between the bore thereof and the periphery of same on the inner circumference of same, a high frequency conductor wire embedded in said body and being formed into a plurality of substantially parallel convolutions extending around the bore of same, said convolutions being closely adjacent each other and being at an angle of approximately 30 degrees with a radius of said body, and a pair of high frequency conductors embedded in said body and extending therearound on the inner circumference thereof, said conductors being in contact with all of said convolutions of said conductor wire and with said valve stem.

8. An airbag for the vulcanization of tires comprising a resilient arcuate body having a bore therein, and a plurality of endless convolutions of an electrical conductor extending around the bore of said body at an acute angle of at least about 30 degrees to a radius of the body.

9. An airbag for use in the vulcanization by high frequency of pneumatic tires and the like, which airbag comprises an annular body of rubber which is tubular in section, and a layer of oval-shaped endless convolutions of conductive means embedded in said body and extending completely around the tubular body, said convolutions making an acute angle of at least about 30 degrees to a radius of the said body.

10. An airbag for use in the vulcanization by high frequency of pneumatic tires and the like, which airbag comprises an annular body of rubber that is tubular in section, a layer of separate oval-shaped convolutions of conductive means embedded in said body in substantially parallel relation at an angle of at least about 30 degrees to a radius of the said body, and power supply means connecting directly to each of said convolutions.

11. An airbag for use in the vulcanization by high frequency of pneumatic tires and the like, which airbag comprises an arcuate body of rubber that is tubular in section, and a layer of oval-shaped convolutions of conductive means embedded in said body in substantially parallel relation at an angle of at least about 30 degrees to a radius of the said body.

12. An airbag for use in the vulcanization by high frequency of pneumatic tires and the like, which airbag comprises an annular body of rubber that is tubular in section, a layer of oval-shaped convolutions of conductive means embedded in said body at an acute angle of at least about 30 degrees to a radius of the said body, and power supply means connecting directly to at least a major portion of said convolutions.

13. An airbag for use in the vulcanization by high frequency of pneumatic tires and the like, which airbag comprises an annular body of rubber that is tubular in section, and a layer of oval-shaped convolutions of conductive means embedded in and forming a ring extending completely around said body at an acute angle of at least about thirty degrees to a radius of the said body.

ROBERT S. ENABNIT.

REFERENCES CITED

The following references are of record in the file of this patent:

UNITED STATES PATENTS

| Number | Name | Date |
| --- | --- | --- |
| 1,339,736 | Burke | May 11, 1920 |
| 1,410,023 | McGuire | Mar. 21, 1922 |
| 1,923,736 | Lewis et al. | Aug. 22, 1933 |
| 2,411,558 | Semler | Nov. 26, 1946 |
| 2,451,992 | Te Grotenhuis | Oct. 19, 1948 |